United States Patent
Patel

(10) Patent No.: US 6,440,259 B1
(45) Date of Patent: Aug. 27, 2002

(54) ONE-PART STORAGE-STABLE WATER-BASED CONTACT ADHESIVE COMPOSITION WITH AN INTERNAL COAGULANT

(75) Inventor: Vijay Patel, London (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/368,114

(22) Filed: Aug. 4, 1999

(51) Int. Cl.$^7$ ............................................... C09J 101/00
(52) U.S. Cl. ....................... 156/332; 156/333; 524/238; 524/417
(58) Field of Search ................................ 156/332, 333; 524/238, 417

(56) References Cited

U.S. PATENT DOCUMENTS

| | | | |
|---|---|---|---|
| 2,323,338 A | * 7/1943 | MacDonald | ................. 524/417 |
| 3,144,428 A | * 8/1964 | Kost | ......................... 156/333 |
| 5,264,467 A | 11/1993 | DiStefano | |
| 5,476,896 A | 12/1995 | Pereira et al. | |
| 5,543,455 A | 8/1996 | Shah | |

FOREIGN PATENT DOCUMENTS

| | | | |
|---|---|---|---|
| EP | 0470928 | * 2/1992 | ................. 156/333 |
| GB | 738340 | * 10/1955 | ................. 524/238 |
| JP | 57 108174 A | 7/1982 | |
| JP | 57-115472 | * 7/1982 | ................. 524/517 |
| JP | 61-221241 | * 10/1986 | ................. 524/238 |
| WO | WO 98/53019 | 11/1998 | |

OTHER PUBLICATIONS

DuPont Dow Elastomers, Technical Information, AquaStik™, *Water Based Adhesives for Furniture Foam: Quick Break Adhesives*.

Carl, J.C., "Fluid Properties," *Neoprene Latex: Principles of Compounding and Processing*, E.I. DuPont de Nemours & Co., pp. 18–19 (1962).

Gerlach, Dieter, "Polychloroprene—An Evergreen Product for the Formulation of Water Based Contact Adhesives," *Advances in Adhesives & Sealants Technology*, Paper 14.

* cited by examiner

Primary Examiner—John J. Gallagher
(74) Attorney, Agent, or Firm—Scott A. Bardell

(57) ABSTRACT

The invention provides contact adhesives comprising an adhesive component comprising polychloroprene rubber, and an internal coagulant. The contact adhesives may also contain a resinous component selected from the group consisting of ethylene-vinyl acetate copolymer, polyvinyl acetate homopolymer, polyvinyl acetate copolymer, acrylic copolymer, polyvinyl acetate acrylic copolymer, and combinations thereof. The internal coagulant may be hygroscopic salt, amino acid, or a combination thereof.

18 Claims, No Drawings

ONE-PART STORAGE-STABLE WATER-BASED CONTACT ADHESIVE COMPOSITION WITH AN INTERNAL COAGULANT

FIELD OF THE INVENTION

This invention relates to adhesive compositions, especially aqueous-based contact adhesive compositions. The adhesive finds particularly preferred use for bonding substrates such as high-pressure laminate (HPL), to particleboard for kitchen counter tops in the decorative laminate industry.

BACKGROUND OF THE INVENTION

In the past decade, environmental considerations have forced reevaluation of many established products. Contact adhesives based on elastomeric polymers, which have been available commercially for several decades, fall into this category.

The term contact adhesive refers to an adhesive which is typically applied to two surfaces to be adhered together, dried to form film adhesive layers, and brought into contact with pressure so as to form an immediate, durable bond. Once the contact adhesive is pressed together, the adhered pieces are ready for further processing such as cutting.

Many contact adhesive applications require that soon after applying the adhesive to the substrates to be contacted that the adhesive film dries and forms a film within five minutes and thereafter pressing the coated substrates together, the adhesive rapidly bonds to itself. That is, the adhesive undergoes auto adhesion and forms a semi-solid film with sufficient strength to hold the substrates together and resist subsequent forces on the fresh bond line that might cause failure. Adhesives that provide a dried adhesive film within five minutes and develops handling strength properties immediately after bonding without adhesive squeeze out can be referred to as "fast set" contact adhesives. Quick-drying flammable and chlorinated organic solvents have been conventionally utilized as carriers for fast-set contact adhesives since their quick drying film forming properties facilitate quick holding together of the bonded parts after their coated surfaces are mated and pressed together within five minutes after applying to the substrate.

Flammable and chlorinated solvent-based contact adhesives have traditionally dominated the high-pressure laminate industry. The low boiling point organic solvents used as carriers for contact adhesives provide the advantage of rapid dry times, whereupon the workpieces may be contact adhered within five minutes after application of the adhesive compositions. While such products have been used both in consumer and industrial applications, generally the use of solvent-based systems has declined as a result of concerns related to the presence of volatile and organic solvents. It is, therefore, a goal of the adhesive industry to develop alternative contact adhesives, which exhibit fast set and physical properties equivalent to those of solvent-based adhesives, but wherein the amount of organic solvent is substantially reduced or completely eliminated.

Most of the commercially available water-based contact adhesives are based on polychloroprene and/or acrylic/vinyl acrylic type latices, typically in combination with materials such as resins, plasticizers, antioxidants, and other ingredients commonly used in adhesive compositions (see U.S. Pat. No. 5,543,455). The current one-part water-based adhesives have experienced only gradual industry acceptance due to longer dry times and relatively slow rate of strength build. (See U.S. Pat. No. 5,264,467, showing a one hour dry time). To overcome such limitations, two-part, co-sprayed, water-dispersed, high solid content adhesive systems have been developed that demonstrate similar dry times to solvent-based adhesives and provide strength build within seconds. (See DuPont Dow Elastomer, Technical Information, AquaStik™, "*Water Based Adhesive for Furniture Foam: Quick Break Adhesives.*") Current two-part adhesives typically consist of a bulk adhesive and an external coagulant. Typically an external coagulant based on an acid such as citric, lactic or acetic acid, or salts such as zinc sulfate are used as a co-spray in predetermined ratio. Such two-part adhesive systems are not entirely satisfactory because the equipment is expensive and requires regular maintenance as well as the need to monitor the ratio of coagulant to base adhesive.

Fast-set adhesives have not been obtained without decreasing storage stability at room and elevated temperatures. To date, fast set times and storage stability has not been satisfactorily obtained within the same adhesive composition in a one-part system. The problem has been that in order to achieve a fast-setting adhesive composition, it is necessary to find some additive or additives to make the resulting adhesive composition sensitized and unstable enough that the colloid polymer system immediately "breaks" on application and forms a high strength film, but yet does not make the composition unstable to the point that it will coagulate during storage and before application. Such additives are sometimes referred to as internal coagulants or gelling agents.

Additives used to sensitize anionic-stabilized latex compounds and improve their ability to break upon application are often acidic. The reaction of the acid is immediate depending upon the type of acid. Therefore, the acid must be added at the point of application. For example, Carl, J. C., "Fluid Properties," *Neoprene Latex: Principles of Compounding and Processing*, E.I. DuPont de Nemours & Co., p. 18–19 (1962) discusses the use of sodium and potassium silicofluorides.

Amino acids, such as glycine, do not coagulate neoprene latex but do destabilize by reducing pH. For example, in the production of neoprene foam and dipped goods, pH reduction with glycine is advantageous. Glycine shortens the interval between the addition of gelling agent and the start of coagulation. Anionic neoprene latex compounds are unstable at a pH of less than 10.5.

To comply with consumer demand, it would be desirable to find a storage-stable one-part aqueous-based adhesive that facilitates fast set similar to solvent-based adhesives. Initially it was found that by lowering the pH of anionically stabilized, high crystallinity, low gel content polychloroprene latices, faster set would result. Adjusting the latex pH to 9.5–10.5 maintains an adequate shelf and pumping stability but sufficiently destabilizes the latex to create fast breaking properties on spraying. However, the resulting fast breaking adhesive demonstrates an inadequate immediate bonding capability with fairly low strength characteristics. Further, lowering the pH results in poor colloidal stability at room and elevated temperature and thus loss of formulating latitude with typical materials used in polychloroprene adhesive compositions. (See PCT WO 98/53019).

Another approach to fast break technology is to formulate a polymeric latex blend with relatively low shear stability, which can be spray-applied but coagulates very quickly through moisture loss. In this particular approach, fast crystallizing and/or low molecular weight polychloroprene lattices whose pH ranges are between 10 and 13, are blended with an acrylate dispersion whose pH range is between 3 and 5. The acrylate dispersion provides "some initial tack and also has a destabilizing effect, which accelerates coagulation". (See Gerlach, Dieter, "Polychloroprene-An Evergreen Product for the Formulation of Water Based Contact Adhesives," *Advances in Adhesives & Sealants Technology*, paper 14). Adhesives formulated with this technology typically show very poor storage stability and mechanical instability.

Thus, there is a need for an aqueous-based polychloroprene contact adhesive that is available in one part. The contact adhesive must be storage stable, yet capable of fast setting. It is also desirable that the contact adhesive be capable of developing enough strength for demanding applications within a short period of time.

SUMMARY OF THE INVENTION

In one aspect, the invention provides a stabilized, one-part, water-based contact adhesive composition that comprises an adhesive component comprising polychloroprene rubber, a resinous component, and an internal coagulant. The resinous component is selected from ethylene-vinyl acetate copolymer, polyvinyl acetate homopolymer, polyvinyl acetate copolymer, acrylic copolymer, polyvinyl acetate acrylic copolymer, and combinations thereof. The polychloroprene rubber component may comprise a mixture of polychloroprene rubbers, a mixture of polychloroprene rubber and natural rubber, synthetic rubber, or combinations thereof, and make up the adhesive component of the composition. The internal coagulant is a hygroscopic salt, preferably in an amount of about 0.06 percent to about 6 percent, more preferably, about 0.3 percent to about 1.2 percent by weight based on dry weight of the total adhesive component.

The composition can also contain an amino acid as an internal coagulant, such as glycine, preferably in an amount of about 0.1 percent to about 12 percent by weight based on dry weight of the total adhesive component, and even more preferably in an amount of about 1 percent to about 6.5 percent by weight based on the dry weight of the total adhesive component.

In another aspect, the invention provides a method of bonding two substrates together comprising the steps of applying an adhesive composition comprising polychloroprene rubber, a resinous component selected from the group consisting of ethylene-vinyl acetate copolymer, polyvinyl acetate homopolymer, polyvinyl acetate copolymer, acrylic copolymer, polyvinyl acetate acrylic copolymer, and combinations thereof, and an internal coagulant, to a surface of both substrates, allowing the adhesive composition to dry and contacting the adhesive applied surfaces together. By "dry", it is meant that there is no adhesive transfer when light finger pressure is applied to the adhesive composition in film form.

In another aspect, the invention provides a stabilized, one-part, water-based contact adhesive composition that comprises an adhesive component comprising polychloroprene rubber and an internal coagulant wherein the internal coagulant is a mixture of a hygroscopic salt and an amino acid. The amount of hygroscopic salt and amino acid used in combination in the composition is additive. Thus, the composition can contain both hygroscopic salt and amino acid preferably in an amount of about 0.16 percent to about 18 percent, more preferably about 1.3 percent to about 7.7 percent based on the dry weight of the total adhesive component.

"Shelf life" refers to the time period after which the aqueous composition has substantially coagulated, congealed, curdled, separated, settled, or formed non-easily mixable or non-easily dispersible layers so that it may not be usefully or readily applied as a homogeneous, uniform liquid blend by spray-coating methods. That is, compositions that have good shelf life are storage stable. By "storage stable," it is meant that the aqueous compositions have a shelf life of greater than about four months when stored at room temperature (25° C. S.T.P.). Preferably, the aqueous compositions have a shelf life of greater than about 6 months, and more preferably greater than about 8 months when stored at room temperature.

"Fast-setting" means that the adhesive dries (as defined above) and forms a film within 5 minutes after application. Preferably, fast-setting contact adhesive compositions of the invention form a dried film adhesive in less than 5 minutes after application. For some utilities, particularly when bonding high pressure laminate to counter tops in the laminate industry, fast-setting contact adhesive compositions of the invention preferably dries within 3 minutes or less after application. After pressing the coated substrates together, the adhesive provides sufficient overlap shear strength to hold the substrates together and generally have a minimum strength of about 10 to about 20 psi (about 68.9 to about 138 Pa).

The adhesive compositions are fast setting due to the low pH of the compositions. It is preferred that the compositions have a pH in the range of about 8 to about 12. More preferably, the pH of the compositions is about 8.0 to about 10.5, even more preferably from about 9.0 to about 10.0, and most preferably from about 9.2 to 9.6.

DETAILED DESCRIPTION OF THE INVENTION

Aqueous-based adhesive compositions according to the present invention comprise polychloroprene in the form of an aqueous dispersion. By "aqueous" it is meant that the carrier is primarily water. However, organic solvents may be present, so long as they do not substantially compromise storage stability of the composition. Incidental solvents, such as those present in additives and commercially available components may also be present. Preferably, however, "aqueous" refers to a 100 percent water carrier.

Polychloroprene, as used herein, refers to a homopolymer or copolymer of chloroprene (2-chloro-1,3-butadiene). Co-monomers for use in copolymers include a wide variety of compounds such as styrene, vinyl toluene, 2,3-dichlorobutadiene, acrylic acid, methacrylic acid, and derivatives such as methacrylates, acrylates, and acrylonitriles.

Polychloroprene is readily available as an aqueous dispersion, such as a latex or emulsion. While a broad range of dispersions are suitable, useful commercially available dispersions generally have from about 30 percent to about 65 percent, more usually from about 45 percent to about 60 percent, preferably from 40 percent to 50 percent or 60 percent by weight solids content. The dispersions generally have a particle size in the range of from about 0.1 microns in diameter to about 0.4 microns in diameter, depending on the specific grade.

Polychloroprene dispersions are typically stabilized to prevent the dispersion from coagulating during storage. By stabilization, it is meant that the pH is raised to prevent coagulation due to a decrease in the pH. As the pH of the dispersion drops to 10 or below, there is a tendency to coagulate. The pH tends to drop gradually on storage. Therefore, as mentioned above, commercially available polychloroprene dispersions often include a strong alkali, such as potassium hydroxide, and may have a pH any where from about 10 to about 13, but commonly from about 12 to about 13.

Any suitable stabilizer may be utilized. For example, surfactants may be added to stabilize the dispersion, usually anionic or nonionic surfactants. Thus, a dispersion referred to as an anionic surfactant-stabilized polychloroprene is a polychloroprene dispersion stabilized by an anionic surfactant. Anionic surfactant-stabilized polychloroprene dispersions or a blend of anionic/nonionic surfactant-stabilized polychloroprene dispersions are preferred, however, for the present compositions.

Suitable anionic surfactant-stabilized polychloroprene dispersions include those available from DuPont Dow Elastomers Llc, Wilmington, Del., under the tradenames: LATEX 750 ("750"); and AQUASTIK GRADES AQS2920, AQS2540, AQS2126, and AQS9426 ("2920", "2540", "2126", and "9426"). Another suitable anionic surfactant-stabilized polychloroprene dispersion is DISPERCOLL C74, available from Bayer Corporation, Pittsburgh, Pa. ("C74"). A suitable anionic/nonionic surfactant-stabilized polychloroprene blend dispersion is available from Bayer Corporation under the tradename DISPERCOLL C84 ("C84"). A suitable sol polymer polychloroprene dispersion is available from Dupont Dow Elastomers Llc under the tradename LATEX 735 ("735").

Polychloroprene is available in a wide variety of types, from low to high crystallinity, and from low to medium or high gel. The type of polychloroprene used can influence the ability of the composition to achieve a fast set time and other properties of the resulting bond. The effects from the choice of polychloroprene can be seen in the examples following.

Besides polychloroprene, the adhesive composition may also contain a resinous component selected from vinyl acetate ethylene emulsion (VAE), polyvinyl acetate homopolymer emulsion, polyvinyl acetate copolymer emulsion, acrylic copolymer emulsion, polyvinyl acetate acrylic emulsion, or combinations thereof. Preferably, the commercially available emulsions are 40 to 65 percent by weight solid content. Suitable polyvinyl acetate ethylene emulsion and polyvinyl acetate acrylic emulsion include those available from Air Products and Chemicals, Inc, Allentown, Pa., under the tradenames: AIRFLEX 405, AIRFLEX 410, AIRFLEX 420, and AIRFLEX 465; and FLEXBOND 150, FLEXBOND 153, FLEXBOND 165 and FLEXBOND 825, respectively. Other suitable polyvinyl acetate acrylic emulsions are those having the tradenames ROVACE 6930 and ROVACE 3270, available from Rohm and Haas Company, Philadelphia, Pa. A suitable polyvinyl acetate homopolymer emulsion is available from Air Products and Chemicals, Inc under the tradename VINAC 285. The resinous component may be present in the adhesive compositions of the invention at a level of from about 3.5 to about 30 parts per hundred (phr), preferably, about 5 to about 20 phr, more preferably, about 7.5 to about 15 phr based on the dry weight of the adhesive component.

The adhesive compositions of the invention also contain an internal coagulant. The function or purpose of an internal coagulant is to enhance dry film formation. A useful internal coagulant is a fully neutralized hygroscopic salt; that is, a salt in which all exchangeable protons has been replaced by cations. Examples of useful hygroscopic salts include hygroscopic phosphates and sulfates. Preferred hygroscopic salts include Li, Na, and K sulfates and phosphates. Preferred salts include tri-sodium phosphate and di-sodium sulfate. The hygroscopic salts may be anhydrous or partially hydrated.

Another useful internal coagulant is an amino acid. Useful amino acids include water soluble, lower molecular weight amino acids such as glycine, alanine, valine, lysine, isoleucine, leucine, and combinations thereof, with glycine being preferred. Preferably, the amino acid is used in the form of a solution containing from about 5 percent to about 25 percent by weight, more preferably about 10 percent to about 18 percent by weight of amino acid.

Preferably, the adhesive compositions of the invention contain a mixture of a hygroscopic salt and an amino acid. A preferred combination is a hygroscopic phosphate and glycine. Generally the ratio of hygroscopic salt to amino acid ranges from about 5:1 to about 1:5 by weight and preferably from about 2:1 to about 1:2 by weight.

The adhesive component of the compositions of the invention may also contain natural rubber, another synthetic rubber, or combinations thereof. Preferably, such natural and synthetic rubbers have unsaturated chains derived from units such as butadiene or have units derived from $C_4$ to $C_{10}$ conjugated dienes, such as styrene or methyl methacrylate. Natural rubber is commercially available as modified general-purpose latex. For example, modified latex is available under the tradenames MEGAPOLY latex, as MG 49, and as MG 30 (rubber latices grafted with methyl methacrylate and available from H. A. Astlett and Co., Inc., Toronto, Ontario). Other synthetic rubbers include homopolymers of butadiene, isoprene, or dimethyl butadiene. Other useful synthetic rubbers include copolymers of butadiene and styrene, isoprene and styrene, butadiene and dimethyl butadiene, butadiene and acrylonitrile, isoprene and acrylonitrile, dimethyl butadiene and styrene, butadiene and vinyl toluene, or isoprene and vinyl toluene. A suitable commercially available synthetic rubber is ROVENE 8329 (modified styrene butadiene rubber latex emulsion, available from Mallard Creek Polymers, Inc, Charlotte, N.C.).

More than one type of polychloroprene can be blended together to form the polychloroprene rubber component. Blending is permitted so long as the aggressiveness or initial bond strength of the compositions is not significantly compromised. If polychloroprene and a natural rubber are blended, it is preferred that the natural rubber ranges from about 10 percent to about 90 percent by weight, more preferably from about 30 percent to about 60 percent by weight based on the dry weight of the adhesive component.

One or more tackifiers may be used in the contact adhesives of the invention. Tackifiers can be used at levels of up to about 50 percent by weight, preferably about 30 percent by weight, and more preferably about 5 percent by weight to about 20 percent by weight based on the dry weight of the total adhesive component. About 25 to about 60 phr based on the dry weight of the total adhesive component would also be suitable. Suitable tackifiers for use in the contact adhesives of the invention include rosin acids, rosin esters, terpene phenolic resins, hydrocarbon resins, and cumarone indene resins. The tackifier will generally be used in the form of an aqueous dispersion.

Typically, about 1 to about 6 phr of acid acceptor may be added based on dry weight of the total adhesive component to minimize the degradation of the adhesive composition due to release of hydrochloric acid from the polychloroprene rubber. Zinc oxide dispersions are available from Tiarco Chemical Division, Dalton, Ga., under the tradename OCTOCURE 462 and 803. Aqueous epoxy resins, such as those having the tradenames EPI-REZ 3519, EPI-REZ 3515 and EPI-REZ 5003 (available from Shell Chemical Company, Houston Tex.) may also be used.

Viscosity modifiers may be added to thicken the adhesive compositions of the invention. Suitable thickeners include hydrophobically modified, alkali-soluble, acrylic emulsion copolymers, such as those having the tradenames ACRYSOL RM5 and ACRYSOL ASE 95 (available from Rohm and Haas Company), hydrophobically modified urethanes, such as those having the tradenames NOPCO DSX 1550 (available from Henkel Canada Ltd., Mississauga, Ontario), and nonionic, water soluble polymers derived from cellulose, cellulose ethers and carboxymethyl celluloses, such as those having the tradename NATROSOL 250 (a hydroxyethylcellulose, available from Hercules Incorporated, Wilmington, Del.), or inorganic thickeners, such as fumed silica. Thickeners can normally be used at up to about 1 percent by weight of the dry weight of the total adhesive component.

Uncompounded polychloroprene latex generally has good mechanical and storage stability, but the composition may require the incorporation of additional surfactants, wetting agents, or stabilizers. Surfactants, such as MODICAL S (a sulfonated fatty product, available from Henkel Adhesives Corporation, Elgin, Ill.), EMULVIN W (aromatic polyglycol ether, available from Bayer Corporation), and DARVAN WAQ (sodium lauryl sulfate, available from R. T. Vanderbilt Company, Inc., Norwalk, Conn.) are suitable. Typically they would be added at up to about 2 phr based on dry weight of the total adhesive component.

Pigments may be added to color the adhesive compositions of the invention. Suitable pigments are available as powders, which are water dispersible, or as aqueous dispersions. Some suitable pigments include Phthalocyanine Green and Blue Pigment Dispersion (both available from Hilton Davis Inc, Cincinnati, Ohio.), Orange Pigment Aqueous Dispersion (available from Engelhard Corporation, Iselin, N.J.), and Carbon Black Aqueous Dispersion (available from Technical Industries Inc., Peace Dale, R.I.). Typically, pigments may be added at up to about 0.2 phr based on dry weight of the total adhesive component.

Preservatives, such as biocides, may be added to prevent such storage problems as bacterial or fungal attack. Suitable preservatives include having the tradenames TROYSAN 586 (available from Troy Corp., Florham Park, N.J.) and VANCIDE 51 (available from R. T. Vanderbilt Company, Inc.). Typically, such compounds may be added at about 500 parts per million (ppm) to about 1500 ppm based on the wet weight of the total adhesive component.

The aqueous contact adhesive compositions can be prepared by mixing the ingredients together at room temperature. Normal, low shear mixing equipment can be used. Hygroscopic salt and amino acid (if any), and other additives (if any), are preferably added as aqueous solutions, if available.

The adhesive compositions can be prepared without any prior pH adjustment of the polychloroprene used or of any other resinous component that may be present. The pH of the finished composition is generally in the range of from about 8 to about 12. Suitable natural and synthetic rubbers have high pH values and are, therefore, compatible with polychloroprene. Adhesive components that have a pH in the range of from about 9.5 to about 13 are generally compatible with the polychloroprene latex and, thus, facilitate formulation.

When it is desired to use the composition, both surfaces to be adhered are coated with the adhesive composition and brought into contact with at least light hand pressure. The composition can be applied to the surfaces by any suitable method, such as brushing, spraying, or rolling. Preferably and conveniently, the composition is applied to the surfaces by spray coating. Unlike conventional two-part systems, the one-part contact adhesive of the present invention can be sprayed from one container, without the need for expensive equipment and monitoring of the ratio of components. Usually coverage is about 1 gram to about 10 grams (dry weight) per square foot (11.1 grams to 111 $g/m^2$) of surface to be adhered, preferably about 4 grams to about 6 grams per square foot (44.4 grams to 66.7 $g/m^2$). Suitable spray-coating equipment includes manual spray operators and automated spray operators. Suitable manual spray operators include the BINKS 2001 SS (available from Binks Manufacturing Co, Franklin Park, Ill.), BINKS MACH 1, DEVILBISS MSA-503 (available from DeVilbiss Industrial Spray Equipment, Maumee, Ohio.), GRACO 800N and HVLP GRACO OPTIMIZER (available from Graco Inc., Minneapolis, Minn.). Suitable automated spray operators include the BINKS 61, DEVILBISS AGX-4303, GRACO A800N, and BINKS MACH 1 HVLPP.

The adhesive compositions of the present invention are used to provide a contact adhesive for a variety of substrates. The materials bonded together can be the same or of different compositions. Suitable substrates include wood; metal, such as cold-rolled steel, galvanized steel, and aluminum; fabric; paper; foam; plastic, such as polyvinylchloride, polystyrene, polyethylene, polypropylene, and acrylonitrile butadiene styrene (ABS); fiberglass; and materials used to construct high pressure laminates, for example, for counter tops.

| Abbreviation | Tradename | Description |
|---|---|---|
| Index of Abbreviations | | |
| Polychloroprene Rubbers | | |
| 750 | Latex 750 | Anionic surfactant-stabilized polychloroprene dispersion, available from DuPont Dow Elastomers Llc, Wilmington, DE |
| C74 | Dispercoll C74 | Anionic surfactant-stabilized polychloroprene dispersion, available from Bayer Corporation, Pittsburgh, PA |

-continued

Index of Abbreviations

| Abbreviation | Tradename | Description |
|---|---|---|
| C84 | Dispercoll C84 | Anionic/nonionic surfactant-stabiblized polychloroprene dispersion, available from Bayer Corporation, Pittsburgh, PA |
| AQS 2161 | AquaStik 2161 | Anionic surfactant-stabilized polychloroprene dispersion, available from DuPont Dow Elastomers Llc, Wilmington, DE |
| AQS 2530 | AquaStik 2530 | Anionic surfactant-stabilized polychloroprene dispersion, available from DuPont Dow Elastomers Llc, Wilmington, DE |
| AQS 2540 | AquaStik 2540 | Anionic surfactant-stabilized polychloroprene dispersion, available from DuPont Dow Elastomers Llc, Wilmington, DE |
| Resinous Component | | |
| AF 405 | Airflex 405 | Vinyl acetate-ethylene emulsion, available from Air Products and Chemicals, Inc., Allentown, PA |
| AF 410 | Airflex 410 | Polyvinyl acetate acrylic emulsion, available from Air Products and Chemicals, Inc., Allentown, PA |
| AF 420 | Airflex 420 | Polyvinyl acetate acrylic emulsion, available from Air Products and Chemicals, Inc., Allentown, PA |
| AF 421 | Airflex 421 | Polyvinyl acetate acrylic emulsion, available from Air Products and Chemicals, Inc., Allentown, PA |
| F 150 | Flexbond 150 | Polyvinyl acetate copolymer, available from Air Products and Chemicals, Inc., Allentown, PA |
| F 153 | Flexbond 153 | Vinyl acetate-ethylene acrylate terpolymer emulsion, available from Air Products and Chemicals, Inc., Allentown, PA |
| F 165 | Flexbond 165 | Acrylic copolymer emulsion, available from Air Products and Chemicals, Inc., Allentown, PA |
| V 285 | Vinac 285 | Polyvinyl acetate homopolymer emulsion, available from Air Products and Chemicals, Inc., Allentown, PA |
| R 6930 | Rovace 6930 | Polyvinyl acetate acrylic emulsion, available from Rohm and Haas Company, Philadelphia, PA |
| R3270 | Rovace 3270 | Polyvinyl acetate acrylic emulsion, available from Rohm and Haas Company, Philadelphia, PA |
| PC 2149D | Polyco 2149D | Vinyl acetate homopolymer, available from Rohm and Haas Company, Philadelphia, PA |
| Internal Coagulant | | |
| $Na_3PO_4 \cdot 12 H_2O$ | Tri-sodium phosphate dodecahydrate | Available from Rhone-Poulenc Inc, Cranbury, NJ |
| $Na_2SO_4$ | Di-sodium sulfate | Available from Aldrich Chemical Company, Milwaukee, WI |
| | Glycine | Available from Hampshire Chemical Co., Lexington, MA |
| Tackifiers | | |
| Tam E-102 | Tamanol E-102 | Available from Arakawa Chemical USA Inc., Chicago, IL |
| Miscellaneous Additives | | |
| Oc 462 | Octocure 462 | Zinc oxide dispersion, available from Tiarco Chemical Division, Dalton, GA |
| Ol 640 | Octolite 640 | Hindered phenol antioxidant, available from Tiarco Chemical Division, Dalton, GA |

EXAMPLES

The invention will be further illustrated by the following examples, which are illustrative of specific modes of practicing the invention, and are not intended as limiting the scope of the appended claims.

Unless otherwise stated, all percentages are percentages by dry weight and those percentages applying to adhesive compositions are by dry weight of the total amount of adhesive component.

Parts per hundred (phr), unless otherwise stated, are also parts per 100 parts of the dry weight of the adhesive component.

Dashes in the tables indicate that no value was noted or that an ingredient was not present.

Unless otherwise stated, tri-sodium phosphate was added in the form of a 16 percent solids content by weight solution of tri-sodium phosphate dodecahydrate in water and glycine was added in the form of a 15 percent solid content by weight solution in water.

TEST PROCEDURES

Room Temperature (R. T.) Stability

A 500 mL polyethylene bottle is filled to capacity with an adhesive composition of the invention, sealed with a cap, and allowed to stand at room temperature (25° C. S.T.P.). The composition is visually examined at various time intervals. A composition has room temperature stability, i.e., shelf life, if the composition has not substantially coagulated, congealed, curdled, separated, settled, or formed non-easily mixable or non-easily dispersible layers so that it may not be usefully or readily applied as a homogeneous, uniform liquid blend by spray-coating methods. The room temperature stability is reported in days. It is preferred that the composition is stable for at least the length of the stability test.

Elevated Temperature Stability

This test is intended to give an indication of long-term stability at room temperature of a particular composition by subjecting it to elevated temperature.

A composition of the invention is prepared, sealed in a 500 mL polyethylene bottle that was filled to capacity, placed in an air-circulating oven at 50° C., and visually inspected at regular intervals (usually on a daily basis) to see if the composition has coagulated, congealed, curdled, separated, settled, or formed non-easily mixable or non-easily dispersible layers. If coagulation is observed, then the time period, in days, of the previous observation is taken as the Elevated Temperature Stability value. If the test is discontinued before coagulation is observed, then the value is noted as "greater than". For example, ">14 days" indicates that the test was discontinued at 14 days and the composition had not coagulated.

Set Time

In this test, the time required for a liquid composition to become a dry film capable of forming a contact bond with itself is determined. These results give an indication how quickly the composition can permit bonding of parts.

Multiple test coupons are prepared as follows: 10.16 cm×10.16 cm (4 inches×4 inches) high pressure laminated sheet (HPL Grade 10 Standard, available from Wilsonart International, Temple, Tex.) pieces are evenly sprayed with a Binks Model 95 spray gun on one surface to a coating weight of 3 to 3.5 g/0.09 m$^2$ (3 to 3.5 g/ft$^2$) leaving a small area on one end unsprayed to allow for the bonded test coupon to be later pulled apart. These are laid flat on a counter where air movement is not noticeable and timing is started using a stopwatch. At intervals of approximately 15 seconds, the film is tested by sliding a finger over the film (gentle pressure is applied). If any transfer of film to the finger occurs, testing continues. Once there is no transfer to the finger, two laminate pieces with the film on them are pressed together, film side to film side, using light hand pressure to form a test coupon. Immediately, one test coupon is tested to determine if a bond has formed by grasping the unsprayed ends of the laminate and pulling them apart in a 180° C. peel mode. A bond is formed if one of the laminate surfaces is substantially void of adhesive, i.e., the cohesion strength of the adhesive is greater than the adhesion strength between the adhesive and the laminate. If the two films form a bond, timing is stopped. If the films do not form a bond, i.e., there is a substantial amount of the adhesive remaining on each laminate, a test coupon is tested every 15 seconds until a bond is formed. The total time required to dry the film and form a film to film bond is then recorded as the Set Time and is reported in minutes. Compositions with Set Times of less than 5 minutes are considered fast setting.

180° Peel, Twill to Twill

In this test, the adhesive strength of a composition is determined for bonded parts of cotton twill to itself.

Two pieces of cotton twill (available from Rosetrim of Toronto, Ontario, Canada) 2.54 cm (one inch) wide and approximately 22.86 cm (9 inches) long are each coated with three thin (3–4 g/0.09 m$^2$ dry coating weight) layers of the composition being tested with at least 30 minutes dry time between coats using a 2.54 cm (one inch) wide paint brush. After the third layer is allowed to dry, a fourth coat is applied to each piece of twill. After 25 to 35 minutes at room temperature, the two pieces are mated, coated side to coated side, and passed through a power laminator at a pressure of 168.18 kg. (370 pounds) for the 2.54 cm (one inch) width. The bonded part is left at room temperature for at least 2 hours, then conditioned at 50° C. for 24 to 48 hours. Prior to testing, the bonded part is allowed to return to room temperature, the two free ends of the bonded part are peeled apart by hand to a point where the adhesive composition covers the total 2.54 cm width of the twill, the ends are clamped in the jaws of an INSTRON tensile testing machine, and the bonded part is tested at a separation rate of 50 mm per minute. The force required to peel the two pieces of twill apart in a direction 180° C. to the bond line is measured as an average force recorded over the bonded area tested. The force is recorded in Newtons per inch width and converted to pounds per inch width (piw) and kilonewtons per meter (kN/m). The reported value in the Tables is the average of five replicates for each composition tested.

180° Peel, Substrate to Twill

In this test the effectiveness of bonding of a composition is compared for various substrates bonded to cotton twill.

The twill utilized was a 2.54 cm (one inch) wide cotton twill (available from Rosetrim of Toronto, Ontario, Canada). One surface of the substrate is spray coated with the composition being tested using a Binks Model 95 spray gun and one surface of the twill is triple-spray coated with the composition leaving a portion uncoated for attachment within a tensile testing machine. The coated surfaces are allowed to lay open at room temperature for five minutes, then are joined adhesive side to adhesive side using a hand roller to form a test sample. The test sample is subjected to room temperature for 24 hours and then to 50° C. for 24 hours to condition the sample and simulate aging. The test sample is then clamped into the jaws of an INSTRON tensile testing machine and tested at a crosshead speed of 50 mm per minute. The force required to peel back the fabric (in a direction 180° to the bond line) is recorded in pounds per inch width (piw) and converted to kilonewtons per meter (kN/m). The reported value in the Tables is the average of five replicates for each composition tested.

Overlap Shear, Birch to Birch

In this test the effectiveness of bonding of an adhesive composition is determined for a birch to birch bond tested in shear.

The composition to be tested is sprayed onto each of two birch pieces 5.08 cm wide by 10.16 cm long by 0.33 cm thick (two inches by four inches by 0.13 inch) to a coating weight of about 3 to 3.5 g/0.09 m$^2$ (3 to 3.5 grams per foot$^2$) using a Binks Model 95 spray gun. After spraying, the pieces are allowed to dry 15 minutes at room temperature and the coated sides of the two pieces are mated together and mated pieces are passed through a power laminator at a pressure of 168.18 kg (370 pounds) for the 5.08 cm (two inches) width (32.38 kN/m (185 piw)). Samples are prepared in two sets of five (10 samples are averaged). After pressing, the samples are conditioned at room temperature for 24 hours, then at 50° C. for 24 to 48 hours. Prior to testing, the samples are allowed to cool to room temperature and are cut to create a 5.08 cm by 5.08 cm (two inches by two inches) bond area with a 2.54 cm (one inch) end of each side that can be gripped by the jaws of an INSTRON tensile tester. The samples are then tested on the INSTRON at a crosshead speed of 5 mm per minute in shear until the bond fails. Data is recorded in Newtons per 25.8 cm$^2$ (4 inch$^2$). The value reported is the average value of all ten samples and has been converted to pounds per square inch (psi) and kilopascals (kPa).

Edge Lift

In this test the effectiveness of bonding at elevated temperatures of an adhesive composition over a flat surface is determined for a bond between laminate and particleboard. A 0.3 m by 0.3 m by 12.5 mm (one foot by one foot by 0.5 inch) piece of particle board (Industrial Grade particle board, 20.45 kg (45 pound) density) and a slightly larger piece of laminate (FORMICA™, available from Wilsonart International, Inc) are sprayed to a coating weight of about 3 to 3.5 g/0.09 m$^2$ (3 to 3.5 g/ft$^2$) using a Binks Model 95 spray gun. After spraying, the pieces are allowed to dry 15 minutes at room temperature (R. T., about 22° C.) and the coated sides of the two pieces are mated together and the mated pieces are passed through a power laminator at a pressure of 168.18 kg (370 pound) for the 0.3 m (12 inches) width (30 pound per inch width). Then the sample is conditioned at room temperature for 24 hours, followed by 50° C. for 24 to 48 hours. After the sample is returned to room temperature, the excess laminate is trimmed using a laminate trimmer. The sample is then placed in an air-circulating oven at the desired test temperature (70 to 80° C.) and the amount of delamination or separation of the laminate from the particle board that occurs along the length of the edge on each of the four sides of the panel is measured in millimeters (mm) after 1 day, 1 week, and 1 month. The values are reported as the minimum-maximum value range of the four sides measured.

Example 1

The Set Time of various adhesive compositions containing no resinous component was determined with and without glycine and tri-sodium phosphate (Na$_3$PO$_4$.12H$_2$O).

Two grams glycine and 2 Na$_3$PO$_4$.12H$_2$O were added with stirring at R.T. (about 22° C.) for about one minute to each of 100 grams samples of 5 different polychloroprene rubber dispersions and 4 different blends of polychloroprene rubber dispersions. The dispersions used were 750, AQS 2161, AQS 2540, C74, and C84. The blends of polychloroprene rubber dispersions consisted of one part by weight C84 blended with three parts by weight each of 750, AQS 2161, AQS 2540, and C74.

The compositions were tested for Set Time according to the test method outlined above. Results are given in Table 1.

TABLE 1

| Component (s) | Set Time, minutes Without glycine/phosphate | Set Time, minutes With glycine/phosphate |
|---|---|---|
| C74 | 8 | 3 |
| C84 | 10 | 4.8 |
| AQS 2540 | 10 | 2 |
| AQS 2161 | 9 | 3 |
| 750 | 11 | 3 |
| 3:1 C74/C84 | — | 3.5 |
| 3:1 AQS 2540/C84 | — | 2 |
| 3:1 AQS 2161/C84 | — | 3.5 |
| 3:1 750/C84 | — | 3 |

It can be seen from Table 1 that the Set Time for the adhesive compositions containing polychloroprene rubber or blends of polychloroprene rubber and tri-sodium phosphate and glycine is much faster that for polychloroprene rubber compositions without tri-sodium phosphate and glycine.

Example 2

This example illustrates the utility of another hygroscopic salt, di-sodium sulfate, as an internal coagulant in adhesive compositions that contain no resinous component.

Two grams glycine and 2 grams anhydrous Na$_2$SO$_4$ were added with stirring for about one minute at room temperature to each of 100 grams of three different polychloroprene rubber dispersions.

The compositions were tested for Set Time according to the test method outlined above. The polychloroprene rubber dispersion component used, and the Set Times are shown in Table 2.

TABLE 2

| Component | Set Time, minutes |
|---|---|
| AQS 2540 | 2.25 |
| AQS 2161 | 1.3 |
| 750 | 2.0 |

Example 3

The following example demonstrates the utility of a combination of tri-sodium phosphate (Na$_3$PO$_4$.12H$_2$O) and glycine as internal coagulants in adhesive compositions containing a tackifier and no resinous component.

Two grams glycine, 2 grams Na$_3$PO$_4$.12H$_2$O, and 5 grams Tam E-102 were added with stirring for about one minute at room temperature to each of 100 grams of four different polychloroprene rubber dispersions.

After preparation, each composition was measured for Set Time. The polychloroprene rubber component used and the Set Times obtained are indicated in Table 3.

TABLE 3

| Component | Set Time, minutes Without glycine/phosphate | Set Time, minutes With glycine/phosphate |
|---|---|---|
| 750 | >10 | 7 |
| AQS 2540 | >10 | 4.5 |
| AQS 2161 | >10 | 3 |
| C84 | >10 | 2 |

As shown in the table, all the compositions demonstrate a Set Time of less than 10 minutes. In the absence of internal coagulants, the Set Time is in excess of 10 minutes.

Example 4

In this example, the effect of coating weight on Set Time was determined.

Two compositions were prepared with stirring for about one minute at room temperature using glycine and tri-sodium phosphate ($Na_3PO_4.12H_2O$) as internal coagulant.

In the first composition, the polychloroprene rubber used was C74. In the second composition, the polychloroprene rubber used was C84. Two grams of glycine and 2 grams $Na_3PO_4.12H_2O$ were added with stirring at room temperature to 100 grams of each of the polychloroprene rubbers. No resinous component was used.

These compositions were then tested for Set Time according to the test method outlined above except that different coating weights were used. The results are shown in Table 4.

TABLE 4

| Component | Coating Weight, g/0.09m² (g/ft²) | Set Time, minutes |
|---|---|---|
| C74 | 0.9 | 0.3 |
| C74 | 1.8 | 0.75 |
| C74 | 2.2 | 1 |
| C74 | 3.2 | 1.75 |
| C74 | 3.6 | 2.3 |
| C74 | 4 | 4 |
| C74 | 5 | 6 |
| C84 | 1.8 | 1.75 |
| C84 | 2.7 | 3 |
| C84 | 3.2 | 4 |
| C84 | 3.6 | 4.25 |
| C84 | 4 | 5.5 |
| C84 | 4.5 | 6 |

Example 5

This example compares the Set Times of a mixture of a 1:1 blend by weight of two high softening point polychloroprene rubbers and a resinous component, vinyl acetate-ethylene emulsion, with and without three types of internal coagulants: tri-sodium phosphate ($Na_3PO_4.12H_2O$), glycine, and a mixture of glycine and tri-sodium phosphate ($Na_3PO_4.12H_2O$).

The two high softening point polychloroprene rubbers used were C74 and 750. The resinous component used was AF 405.

The adhesive compositions were prepared as follows:

Compositions containing no internal coagulant: 100 grams of 1:1 blend by weight C74 and 750 was combined with 5 grams (5 phr) of AF 405 with stirring at room temperature.

Compositions containing $Na_3PO_4.12H_2O$ internal coagulant: 100 grams of 1:1 blend by weight C74 and 750 was combined with 5 grams (5 phr) of AF 405 with stirring at room temperature to form a mixture. Then, to this mixture was added 1.3 grams of $Na_3PO_4.12H_2O$ per 100 grams of polychloroprene rubber with stirring at room temperature.

Compositions containing glycine internal coagulant: 100 grams of 1:1 blend by weight C74 and 750 was combined with 5 grams (5 phr) of AF 405 with stirring at room temperature. To this mixture, 2.5 grams of glycine per 100 grams of polychloroprene rubber with stirring at room temperature.

Compositions containing a blend of $Na_3PO_4.12H_2O$ and glycine internal coagulants: 100 grams of 1:1 blend by weight C74 and 750 was combined with 5 grams (5 phr) of AF 405 with stirring at room temperature. To this mixture was added 1.3 grams of $Na_3PO_4.12H_2O$ and 2.5 grams of glycine per 100 grams of polychloroprene rubber with stirring at room temperature.

The Elevated Temperature Stability and Set Time were determined according to the test methods for Elevated Temperature Stability and Set Time described above. The results are shown in Table 5.

TABLE 5

| Components | Amount glycine, phr | Amount tri-sodium phosphate, phr | Elevated Temperature Stability, days | Set Time, minutes |
|---|---|---|---|---|
| C74/750/ | 0 | 0 | 7 | 5 |
| AF 405 | 0 | 1.3 | 7 | 4 |
|  | 2.5 | 0 | 5 | 4 |
|  | 2.5 | 1.3 | 30 | 3 |

Adhesive compositions having a Set Time less than 5 minutes are said to have fast set characteristics. It can be seen from Table 5 that while the values of the Set Times for the adhesive compositions with and without internal coagulants are less than 5 minutes, the Elevated Temperature Stability differs. Elevated Temperature Stability indicates a long-term stability (shelf stability) of particular composition at room temperature. Clearly a mixture of glycine and tri-sodium phosphate has far superior Elevated Temperature Stability and is the preferred choice for internal coagulant.

Example 6

This example compares the Set Times of a 1:3 blend by weight of high and low softening point polychloroprene rubbers and a resinous component, vinyl acetate-ethylene emulsion, with three types of internal coagulants: tri-sodium phosphate ($Na_3PO_4.12H_2O$), glycine, and a mixture of glycine and tri-sodium phosphate ($Na_3PO_4.12H_2O$).

The high softening point polychloroprene rubber used was C74 and the low softening point polychloroprene rubber used was C84. The resinous component used was AF 405.

Adhesive compositions were prepared and tested as in Example 5 above except that a mixture of 1:3 blend by weight C74 and C84 was used as the polychloroprene rubber component and the amount of AF 405 used was 7.5 grams (7.5 phr).

The components and amounts of internal coagulants used in each of the four mixtures are indicated in Table 6. The Elevated Temperature Stability and Set Time results are given in Table 6.

TABLE 6

| Components | Amount glycine, phr | Amount tri-sodium phosphate, phr | Elevated Temperature Stability, days | Set Time, minutes |
|---|---|---|---|---|
| C74/C84/ | 0 | 0 | 7 | 4 |
| AF 405 | 0 | 1.3 | 7 | 6.5 |
|  | 2.5 | 0 | 1 | 5.3 |
|  | 2.5 | 1.3 | 30 | 5.3 |

Example 7

In this example, the Set Times of blends of two polychloroprene in four different weight ratios with three different loadings of a resinous component, vinyl acetate-ethylene emulsion, were determined.

The polychloroprene rubbers used were C74 (high softening point polychloroprene), 750 (high softening point polychloroprene), and C84 (low softening polychloroprene). A mixture of 2 phr glycine and 2 phr $Na_3PO_4.12H_2O$ was used as internal coagulant in each of the adhesive compositions. AF 405 was used as the resinous component.

The adhesive compositions were prepared by first combining the polychloroprene rubbers with stirring at room temperature, then adding in turn with stirring at room temperature, the resinous component and the internal coagulant. The compositions were tested for Set Time according to the Set Time test method described above.

The polychloroprene rubbers used, their weight ratios, the amount of AF 405 used and the Set Times obtained are given in Table 7.

TABLE 7

| Components and Ratios | Amount of AF 405, phr | Set Time, minutes |
|---|---|---|
| 3:1 C74/C84 | 5 | 4 |
|  | 7.5 | 2 |
|  | 10 | — |
| 2:1 C74/C84 | 5 | 3 |
|  | 7.5 | 2.25 |
|  | 10 | 2.5 |
| 1:1 C74/C84 | 5 | 3.5 |
|  | 7.5 | 3.5 |
|  | 10 | 3 |
| 1:3 C74/C84 | 5 | 4 |
|  | 7.5 | 3.5 |
|  | 10 | 2 |
| 1:1 C74/750 | 5 | 3.5 |
|  | 7.5 | 4 |
|  | 10 | 3 |

It can be seen from the table that the Set Time is less than five minutes for all of the adhesive compositions. Again the results show the effectiveness glycine and tri-sodium phosphate as an internal coagulant in combination with a resinous component, vinyl acetate-ethylene emulsion. Thus the formulations are particularly preferred fast set compositions in accordance with the present invention.

Example 8

In this example, adhesive compositions were prepared in which the adhesive components were a 1:1 blend by weight of two polychloroprene rubbers and various resinous components.

Each of the compositions contained a blend of 50 grams C74 and 50 grams C84, 5.0 grams AF 405, 2.5 grams glycine, and 1.30 grams $Na_3PO_4.12H_2O$, and varying amounts of resinous component: vinyl acetate ethylene acrylate terpolymer (F153) or polyvinyl acetate copolymer (F165).

The composition were prepared by combining the components with stirring at room temperature in the following order: polychloroprene rubbers, resinous components, and internal coagulants (pre-blended).

The adhesive compositions were tested for Set Time according to the test method outlined above. In addition, the viscosity of each composition was measured at 22° C. using a Brookfield RV Viscometer, #2 spindle, 20 RPM and the coating weight was determined by placing a sample in a forced air oven at greater than 100° C. and heating the sample until a constant weight was obtained. The (final sample weight divided by the initial sample weight) times 100 is equal to the percent solids of the sample.

The component, component amount, adhesive composition coating weight, Viscosity, and the Set Time are shown in Table 8.

TABLE 8

| Resinous Component | Resinous Component Amount, grams | Coating Weight, $g/0.09m^2$ | Viscosity, cps | Set Time, minutes |
|---|---|---|---|---|
| F 165 | 0 | 4.1 | 220 | 3.5 |
|  | 5 | 4.1 | 240 | 4.0 |
|  | 10 | 4.5 | 280 | 4.5 |
|  | 15 | 4.1 | 200 | 4.5 |
| F 153 | 0 | 4.1 | 380 | 3.25 |
|  | 5 | 4.5 | 800 | 4.5 |
|  | 10 | 4.1 | 680 | 5.5 |
|  | 15 | 5.0 | 400 | 10.0 |

Example 9

Seven adhesive compositions (A1 to A7) were prepared by blending in conventional manner the ingredients and amounts set forth in Table 9.

In these compositions, the components are 100 grams of a 1:1 blend by weight of C74 and C84, 7.5 grams AF 405, a mixture of 2.5 grams glycine and 1.25 grams $Na_3PO_4.12H_2O$.

In addition to the components above, 5 grams F 150 was added to A2, A5, and A7;

5 grams V 285 was added to A4;

Oc 462, in the form of a 60 percent by weight dispersion in water, was added at R. T. with stirring to A6 and A7;

Ol 640 was added to A3, A4, A5, A6 and A7 as a 55 percent by weight dispersion in water.

The compositions were prepared as in Example 8 and were tested for Set Time, pH, and Viscosity.

The components and their amounts, Set Times, Viscosity, and pH are given in Table 9. The values are reported as a range that reflects the variation in the properties of the polychloroprene rubber component with time. That is, the longer the time since the manufacture of the polychloroprene rubber component, the greater the shift of its physical characteristics. This is manifested as increased viscosity and increased pH.

TABLE 9

| Adhesive Composition | Added Component and Amount | Set Time, minutes | Viscosity, cps | pH |
|---|---|---|---|---|
| A1 | N/A | 1–5 | 200–1200 | 9.2–9.8 |
| A2 | N/A | 1–5 | 200–1200 | 9.2–9.8 |
| A3 | 3 g Ol 640 | 1–5 | 200–1200 | 9.2–9.8 |
| A4 | 3 g Ol 640 | 1–5 | 200–1200 | 9.1–9.7 |
| A5 | 3 g Ol 640 | 1–5 | 200–1200 | 9.2–9.8 |
| A6 | 2 g Ol 640<br>2 g Oc 462 | 1–5 | 400–2500 | 9.9–10.5 |
| A7 | 3 g Ol 640<br>3 g Oc 462 | 1–5 | 400–2500 | 9.6–10.2 |

Example 10

This example compares the performance of various commercially available water-based contact adhesives and adhesive compositions of the invention.

In this example, commercially available water-based contact adhesives: Fastbond™ 30-NF Green Contact Adhesive (polychloroprene, 47–51 percent by weight solids content, 200–750 cps viscosity, available from Minnesota Mining and Manufacturing Company, St. Paul, Minn.), Lockweld H2O (a polychloroprene contact adhesive, available from Wilsonart International, Inc) and LePage LL518 (a polyvinyl acetate adhesive, available from LePage Company, Inc., Pittsburgh, Pa.) were compared to two adhesive compositions of Example 9, A3, and A5.

Overlap Shear (OLS), 180° Peel Twill to Twill, and Set Time were determined according to the test methods outlined above.

TABLE 10

| Adhesive Composition | Set Time, minutes | Overlap Shear, kPa (psi) | 180° Peel Twill to Twill, kN/m (piw) |
|---|---|---|---|
| A3 | 3 | 703 (102) | 4.55 (26) |
| A5 | 3 | 593 (86) | 4.55 (26) |
| Fastbond 30 | 10 | 758 (110) | 3.5 (20) |
| Lockweld H2O | 10 | 661 (96) | 4.4 (25) |
| LePage LL518 | 10 | 627 (91) | 3.85 (22) |

It can be seen from Table 10 that the value of the Set Times for the adhesives of the invention are superior, less than 5 minutes. Thus, they are particularly preferred fast set contact adhesive compositions according to the present invention.

Example 11

This example compares the performance of the water-based compositions of the present invention and commercially available solvent-based contact adhesive compositions.

In this example, commercially available solvent-based contact adhesives, TEN BOND (polychloroprene adhesive, available from 3M Canada, London, Ontario) and ADBOND (polychloroprene adhesive, available from Adchem Adhesives Inc., Toronto, Ontario) were compared with adhesive compositions A1 and A2 of Example 9.

Overlap Shear (OLS), 180° Peel Twill to Twill, and Edge Lift were determined according to the test methods outlined above.

TABLE 11

| Adhesive Composition | Edge Lift, mm, after 7 days at 80° C. | Overlap Shear, kPa (psi) | 180° Peel Twill to Twill, kN/m (piw) |
|---|---|---|---|
| A1 | 0–0.2 | 958 (139) | 3.85 (22) |
| A2 | 0.2–0.5 | 868 (126) | 3.68 (21) |
| Ten Bond | 0–0.2 | 655 (95) | 3.5 (20) |
| Adbond | 0–0.2 | 703 (102) | 4.18 (24) |

It can be seen from Table 11 that the values obtained for overlap shear (OLS) are superior to those obtained for the solvent-based contact adhesives, and the 180° peel and edge lift results are comparable. Thus the adhesive compositions from the invention are comparable in performance to commercially available solvent-based contact adhesives.

Example 12

Two adhesive compositions, A3 and A5 of Example 9, were tested for peel bond strengths between various substrates used in the decorative laminate industry.

Nine substrates were tested: acrylic, acrylonitrile butadiene styrene (ABS), polyethylene, polypropylene, HPL Grade 10 Standard high pressure laminate, steel (smooth finish), aluminum, galvanized steel, and cold-rolled steel (CRS). The aluminum, galvanized steel, and CRS were cleaned with solvent to remove oils and oxides.

The compositions were tested for 180° Peel, Substrate to Twill according to the test method above. Table 12 shows the results of testing.

TABLE 12

| | 180° Peel kN/m (piw) | |
|---|---|---|
| Substrate | Adhesive Composition A3 | Adhesive Composition A5 |
| Polypropylene | 0.77 (4.4) | 0.93 (5.3) |
| Acrylic | 0.91 (5.2) | 1.02 (5.8) |
| ABS | 0.96 (5.5) | 1.17 (6.7) |
| Polyethylene | 0.70 (4.0) | 0.75 (4.3) |
| Laminate | 1.05 (6.0) | 0.88 (5.0) |
| Steel, smooth | 0.47 (2.7) | 0.39 (2.2) |
| Aluminum | 0.37 (2.1) | 0.70 (4.0) |
| Galvanized steel | 0.54 (3.1) | 0.67 (3.8) |
| CRS | 0.54 (3.1) | 0.42 (2.4) |

Example 13

In this example, the effect of varying the tri-sodium phosphate ($Na_3PO_4 \cdot 12H_2O$) level on Set Time is determined for adhesive compositions containing polychloroprene rubber and no resinous component.

The adhesive compositions were prepared as in Example 1 from a 1:1 blend by weight of C84 and C74, 2.5 grams (2.5 phr) of glycine of polychloroprene rubber, and $Na_3PO_4.12H_2O$.

The Set Time was determined according to the test method hereinabove. The amount of $Na_3PO_4.12H_2O$ used and Set Time is shown in the Table 13.

TABLE 13

| Amount of $Na_3PO_4.12\,H_2O$ added, phr | Set Time, minutes |
|---|---|
| 0.0 | 3.5 |
| 0.6 | 3.5 |
| 1.0 | 3.0 |
| 2.0 | 3.0 |
| 3.0 | 2.5 |
| 4.0 | 2.5 |
| 5.0 | 2.0 |

Example 14

This example compares the effect of tri-sodium phosphate ($Na_3PO_4.12H_2O$) levels on the Set Time and Elevated Temperature Stability for adhesive compositions containing a resinous component and tri-sodium phosphate as the internal coagulant.

Each of the adhesive compositions were prepared as in Example 5 and contained a 1:1 by weight blend of C84 and C74, 7.5 phr of AF 405, and $Na_3PO_4.12H_2O$.

The Set Time and Elevated Temperature Stability were determined according to the test methods hereinabove. The Viscosity was determined at room temperature using a Brookfield RV Viscometer, #2 spindle, 20 RPM.

The amount of $Na_3PO_4.12H_2O$ used, Set Time, Viscosity, and Elevated Temperature Stability are reported in Table 14.

TABLE 14

| Amount of $Na_3PO_4.12$ $H_2O$ added, phr | Set Time, minutes | Viscosity, cps | Elevated Temperature Stability, days |
|---|---|---|---|
| 0.0 | 3.5 | 1080 | <1 |
| 0.6 | 3.5 | 540 | 10 |
| 1.0 | 3.0 | 400 | 13 |

TABLE 14-continued

| Amount of $Na_3PO_4.12$ $H_2O$ added, phr | Set Time, minutes | Viscosity, cps | Elevated Temperature Stability, days |
|---|---|---|---|
| 2.0 | 3.0 | 260 | 9 |
| 3.0 | 2.5 | 200 | 5 |
| 4.0 | 2.5 | 120 | 5 |
| 5.0 | 2.0 | 100 | 5 |

Example 15

The elevated temperature and room temperature stability was determined for adhesive compositions containing self-crosslinking or non-self-crosslinking resinous components, with and without a mixture of glycine and tri-sodium phosphate ($Na_3PO_4.12H_2O$).

The compositions were prepared according to Example 5 using 1:1 by weight blend of C84 and C74, and 5 phr resinous component.

The non-self-crosslinking resinous components used were AF 405, AF 410, R 6930, R 3270, F150, F 153, F 165, V 285, and PC 2149AD. The self-crosslinking resinous components used were AF 420 and AF 421.

Half of the compositions contained 1.3 phr $Na_3PO_4.12H_2O$ and 2.5 phr glycine as internal coagulant.

Each composition was tested for Elevated Temperature and Room Temperature Stability according to the test methods above.

TABLE 15

| | Elevated Temperature Stability | | Room Temperature Stability | |
|---|---|---|---|---|
| Resinous Component | With internal coagulant, days | Without internal coagulant, days | With internal coagulant, days | Without internal coagulant, days |
| AF 405 | 12 | 3 | >30 | >14 |
| AF 410 | 3 | 13 | >30 | >14 |
| AF 420 | 0(1) | 0(1) | 0(1) | 0(1) |
| AF 421 | 3 | 0(1) | <1 | 0(1) |
| R 6930 | 8 | <1 | >30 | >14 |
| R 3270 | 3 | 3 | >30 | 6 |
| F 150 | >12 | >13 | >30 | >14 |
| F 153 | >12 | <1 | >30 | 1 |
| F 165 | >12 | >13 | >30 | >14 |
| V 285 | 5 | <1 | >30 | 6 |
| PC 2149 D | 4 | 3 | >30 | 6 |

(1)Solid chunks formed; materials phased out; incompatible mixture.

As shown in Table 15, the addition of glycine and $Na_3PO_4.12H_2O$ provides improved Elevated Temperature And Room Temperature Stability except for those self-crosslinking resinous components that are incompatible with the rest of the components of the adhesive composition.

What is claimed is:

1. A stabilized, one-part, water-based adhesive composition comprising:
   a) an adhesive component comprising polychloroprene rubber;
   b) a resinous component selected from the group consisting of ethylene-vinyl acetate copolymer, polyvinyl acetate homopolymer, polyvinyl acetate copolymer, acrylic copolymer, polyvinyl acetate acrylic copolymer, and combinations thereof; and c) an internal coagulant comprising from about 0.3 to about 1.2 percent by weight based on the dry weight of the adhesive component of an amino acid, wherein said adhesive composition is a contact adhesive composition.

2. The contact adhesive composition of claim 1 wherein the internal coagulant further comprises a hygroscopic salt.

3. The contact adhesive composition of claim 2 wherein the hygroscopic salt is a phosphate, a sulfate, or a combination thereof.

4. The contact adhesive composition of claim 1 wherein the amino acid is selected from the group consisting of glycine, alanine, valine, lysine, iso-leucine, leucine, and combinations thereof.

5. The contact adhesive composition of claim 2 wherein the hygroscopic salt is tri-sodium phosphate or di-sodium sulfate and the amino acid is glycine.

6. The contact adhesive composition of claim 2 wherein the hygroscopic salt is present in the composition at a level of from about 0.06 to about 6 weight percent based on the total weight of the adhesive component.

7. The contact adhesive composition of claim 1 further comprising a tackifier.

8. The contact adhesive composition of claim 1 wherein the adhesive component further comprises natural rubber, synthetic rubber, or a combination thereof.

9. A stabilized, one-part, water-based adhesive composition comprising:

a) an adhesive component comprising polychloroprene rubber; and b) an internal coagulant, wherein said internal coagulant is a mixture of a hygroscopic salt and from about 0.3 to about 1.2 percent by weight based on the dry weight of the adhesive component of an amino acid and wherein said adhesive composition is a contact adhesive composition.

10. The contact adhesive composition of claim 9 wherein the hygroscopic salt is a phosphate, a sulfate, or combinations thereof.

11. The contact adhesive of claim 9 wherein the amino acid is selected from the group consisting of glycine, alanine, valine, lysine, iso-leucine, leucine, and combinations thereof.

12. The contact adhesive of claim 9 wherein the internal coagulant is present in the composition at a level of from about 0.16 to about 18 weight percent based on the total weight of the adhesive component.

13. The contact adhesive composition of claim 9 wherein the ratio of hygroscopic salt to amino acid is in the range of about 1:5 to about 5:1.

14. The contact adhesive composition of claim 9 further comprising a tackifier.

15. The contact adhesive of claim 1 further comprising an acid acceptor.

16. The contact adhesive of claim 9 further comprising an acid acceptor.

17. A method of bonding two substrates together comprising the steps of:

a) applying an adhesive composition of claim 1 to a surface of both substrates;

b) allowing the adhesive composition to set; and c) contacting the surfaces together.

18. A method of bonding two substrates together comprising the steps of:

a) applying an adhesive composition of claim 9 to a surface of both substrates;

b) allowing the adhesive composition to set; and c) contacting the surfaces together.

* * * * *

UNITED STATES PATENT AND TRADEMARK OFFICE
CERTIFICATE OF CORRECTION

PATENT NO. : 6,440,259 B1
DATED : August 27, 2002
INVENTOR(S) : Patel, Vijay

It is certified that error appears in the above-identified patent and that said Letters Patent is hereby corrected as shown below:

<u>Column 17,</u>
Table 6, 4$^{th}$ row, delete "2.5    1.3    30    5.3" and insert in place thereof
-- 2.5    1.3    30    3.5 --.

Signed and Sealed this

Twenty-ninth Day of June, 2004

JON W. DUDAS
*Acting Director of the United States Patent and Trademark Office*